(12) United States Patent
Blais (10) Patent No.: US 7,540,076 B2
(45) Date of Patent: Jun. 2, 2009

(54) METHOD OF MANUFACTURING HOT RUNNER SYSTEM COMPONENTS OF TWO MATERIALS

(75) Inventor: Paul Blais, South Burlington, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 11/491,343

(22) Filed: Jul. 21, 2006

(65) Prior Publication Data

US 2006/0265854 A1    Nov. 30, 2006

Related U.S. Application Data

(62) Division of application No. 10/647,364, filed on Aug. 25, 2003, now Pat. No. 7,413,131.

(51) Int. Cl.
*B21D 39/03* (2006.01)
*B21D 51/16* (2006.01)
*B05B 1/24* (2006.01)

(52) U.S. Cl. ............... 29/469; 239/132; 29/890.142

(58) Field of Classification Search ............ 29/890.142, 29/469, 428; 239/135, 707, 533.2, 518; 425/549
See application file for complete search history.

(56) References Cited

U.S. PATENT DOCUMENTS

| | | | | |
|---|---|---|---|---|
| 4,069,978 | A | * | 1/1978 | El Moussa ............... 239/533.2 |
| 4,258,885 | A | * | 3/1981 | Legeza ...................... 239/707 |
| 5,208,052 | A | | 5/1993 | Schmidt et al. |
| 5,324,191 | A | * | 6/1994 | Schmidt ..................... 425/549 |
| 5,374,182 | A | | 12/1994 | Gessner |
| 5,421,716 | A | | 6/1995 | Gellert |
| 5,507,637 | A | | 4/1996 | Schad et al. |
| 5,573,185 | A | * | 11/1996 | Schwarzkopf .............. 239/135 |
| 5,879,727 | A | | 3/1999 | Puri |
| 6,009,616 | A | | 1/2000 | Gellert |

* cited by examiner

*Primary Examiner*—John C Hong (57) ABSTRACT

A method of manufacturing a variety of injection molding hot runner system components using two materials. Blanks for portions of the components are formed of each material and fused, preferably by electron beam welding, then the component having the two portions is machined to its final configuration. Components made with this process include nozzle tip components such as tips, tip retainers, and tip inserts, as well as manifold bushings, valve stems and nozzle housings.

12 Claims, 9 Drawing Sheets

METHOD OF MANUFACTURING HOT RUNNER SYSTEM COMPONENTS OF TWO MATERIALS

CROSS-REFERENCE TO RELATED APPLICATION

This patent application is a divisional patent application of prior U.S. patent application Ser. No. 10/647,364, filed Aug. 25, 2003. This patent application also claims the benefit of prior U.S. patent application Ser. No. 10/647,364, filed Aug. 25, 2003.

The present invention relates, generally, to injection molding systems, and more particularly, but not exclusively, the invention relates to hot-runner components, particularly manifold bushings and nozzles with separate tips or tip inserts secured by a separate retainer piece.

BACKGROUND INFORMATION

The state of the art includes various components, including manifold bushings, nozzles and tips for hot runner injection molding systems. Hot-runner nozzles are typically either a valve-gate style or a hot-tip style. In the valve-gate style, a separate valve stem moves inside the nozzle and tip acting as a valve to selectively start and stop the flow of resin through the nozzle. The valve stem may be guided through the nozzle by a bushing in the manifold against which the nozzle seats. In the hot-tip style, a small gate area at the end of the tip freezes off to thereby stop the flow of resin through the nozzle. The present invention applies to both style nozzles.

Hot runner nozzles often have removable tips, either a single-piece tip or two-piece tip assemblies having an inner tip with an outer tip retaining portion. For two-piece assemblies, the inner tip insert is secured in the nozzle housing by the tip retaining portion that typically threadably engages the nozzle housing.

The tip retaining portion of the two-piece tip assemblies and the single-piece tip includes a nozzle seal near the end adjacent the mold. Since the nozzle seal contacts the mold, which is cold relative to the nozzle tip, it is preferable that the nozzle seal material has low thermal conductivity so that heat from the nozzle and nozzle tip is not transmitted into the mold through the nozzle seal.

In a single-piece tip such as that shown in U.S. Pat. No. 5,507,637, the tip is made entirely of the same material, which can be selected to provide the properties needed for a particular application, such as high wear resistance or thermal properties. However, it may be desirable to have different material properties at different portions of the tip, which cannot be achieved with a single-piece tip made of one material.

In two-piece nozzle tips, such as those described in U.S. Pat. Nos. 5,208,052 and 5,299,928, the outer tip retaining portion is a single piece made of one material, and the inner tip insert is made of another material, typically having higher thermal conductivity such as beryllium-copper alloy or other copper alloys, or a wear resistant material such as a carbide alloy. Typically the outer tip retaining portion is made of stainless or tool steel with a medium thermal conductivity, and for many applications the thermal conductivity of this single-material retainer may be sufficiently low to provide sufficient tip performance. But on other applications less heat transfer between the tip retainer portion and the mold is desired.

U.S. Pat. No. 5,421,716 provides a separate gate insert or seal ring that threadably attaches to the nozzle tip and seals against the mold. The gate insert or seal ring could be made of lower thermal conductivity material than the tip to reduce heat transfer between the tip and the mold. U.S. Pat. No. 5,879,727 provides a threaded insulating portion between the tip and a gate insert which attaches to the insulating portion and seals against the mold. The insulated portion reduces heat transfer between the tip and the mold. While such threaded assembly of components allows disassembly for cleaning, such disassembly may be difficult after parts have been used to process plastic, which can encase the components. Thermal cycling may seize parts together. Also, threading of mating components adds cost to the components.

U.S. Pat. No. 6,009,616 teaches a process for manufacturing an injection molding nozzle by brazing a heater element and a seal ring to the nozzle housing, then brazing a tip insert to the nozzle housing using a second brazing material that melts at a lower temperature than that of the material used for the first braze. However, even the low temperature braze at 850 degrees Fahrenheit is higher than the temperature at which some copper alloys used for nozzle tip components anneal, making the process unsuitable for such materials when strength of the material needs to be maintained.

Manifold bushings, such as those described in U.S. Pat. No. 5,374,182, have a melt channel that directs the flow of molten material through a 90 degree turn. For hot runner systems with valve gate style nozzles, the manifold bushing also receives the valve stem and guides it through a portion of the melt channel. It is important to have a fit between the manifold bushing and the manifold that is tight enough to prevent leakage at the interface of the melt channels of the manifold and the manifold bushing, and it is important that the fit between the valve stem and the manifold bushing allow proper movement of the valve stem in the manifold bushing with minimum leakage of molten material along the valve stem. Manifold bushings made of material such as tool steel can provide the desired guidance, seal and wear-resistance for the valve stem, but because they thermally expand the same as the steel manifold, they are typically sized to require a press fit into the manifold. Manifold bushings made of a material with a higher thermal expansion than that of the steel manifold, such as copper alloys, can be installed without a press fit and rely on their thermal expansion during heat-up to tightly seal against the manifold, but such materials typically may allow too much clearance with the valve stem and not wear as well as steel.

There is a need for components for injection molding systems, such as manifold bushings, one-piece nozzle tips, and tip retainers for a two-piece nozzle tip, to have portions made of different materials to optimize desired material properties at the different portions. There is also a need for such portions to be permanently joined together by a reliable cost-effective process. The present invention provides such components and a manufacturing process for them.

SUMMARY OF INVENTION

The present invention provides an injection molding nozzle tip component removably attachable to a nozzle housing and a method for manufacturing it.

The method preferably comprises the steps of forming a first blank for a first portion of the nozzle tip component, forming a second blank for a second portion of the nozzle tip component, abutting the second blank against the first blank at a junction, fusing the first blank and second blank at the junction, and machining the fused first and second blanks to a configuration for the first portion and second portion of the nozzle tip component. Fusing is preferably done by electron beam welding.

Alternatively, the first and second portions of the nozzle tip component can be premachined aligned and fused, then, if necessary a final machining operation performed to remove material adjacent the junction. The portions may have alignment features which are preferably removed during the final machining operation.

The nozzle tip component comprises a first portion and a second portion fused to the first portion at a junction, the first and second portions being made of different materials. In one embodiment, the junction is oriented substantially radially. Fusing is preferably done by electron beam welding. In one embodiment the first portion is a nozzle tip retainer and second portion is a seal ring. In another embodiment the first portion is a tip portion and the second portion is a cap. In yet another embodiment the first portion is a retaining plate for a multi-probe nozzle tip, and the second portion is a seal ring.

The method may be applied to manufacture other injection molding components besides nozzle tip components. The components formed have two different materials abutting each other. In another embodiment, the component is a manifold bushing. In yet another embodiment the component is a valve stem. In yet another embodiment the component is an injection molding nozzle housing. In yet another embodiment the component is a nozzle tip insert.

BRIEF DESCRIPTION OF DRAWINGS

Exemplary embodiments of the present invention will now be described with reference to the accompanying drawings, in which.

DETAILED DESCRIPTION

Figure 1:
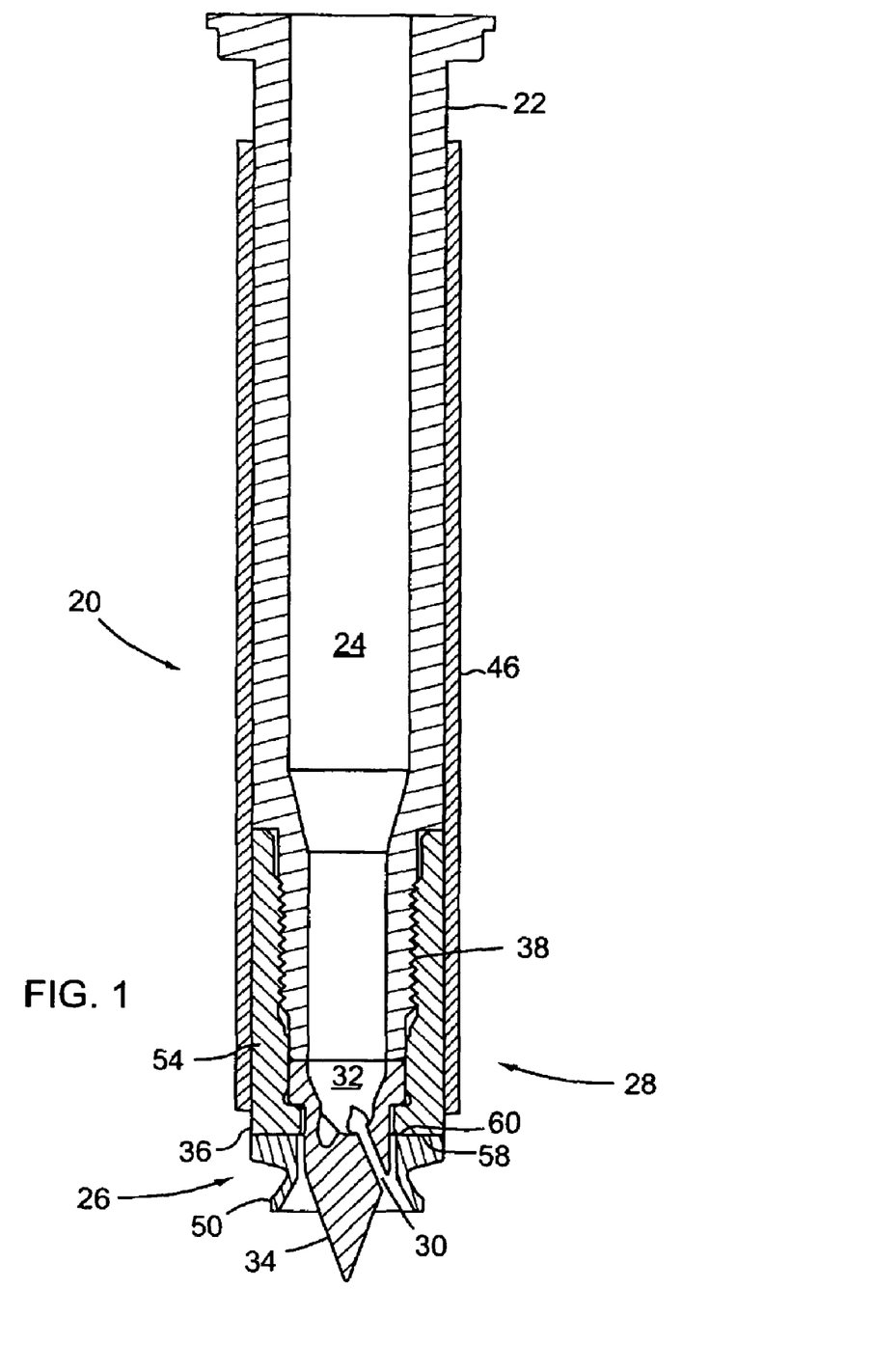
FIG. 1 is a cross sectional view of an injection molding thermal gate nozzle assembly having a tip retainer of the present invention.
Figure 2:
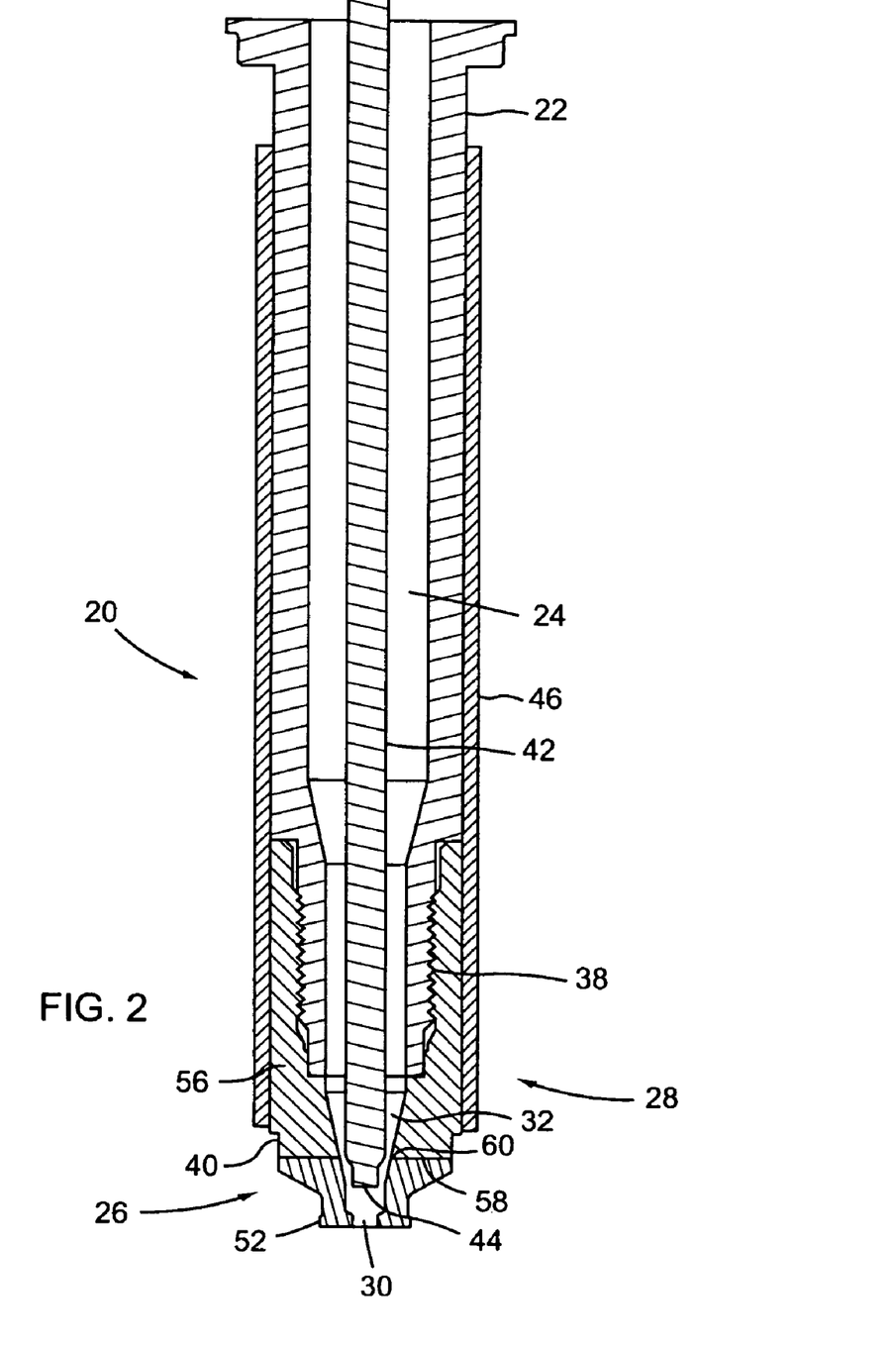
FIG. 2 is a cross section view of an injection molding valve gate nozzle assembly having a tip of the present invention.

Referring to FIGS. 1 and 2, an injection molding nozzle 20 in accordance with a preferred embodiment of the present invention is generally shown. FIG. 1 shows nozzle 20 with a thermal gate configuration, and FIG. 2 shows nozzle 20 with a valve gate configuration. The present invention is applicable to components of both configurations. The injection molding nozzle 20 comprises an elongated nozzle housing 22 having a melt channel 24 therethrough that is in fluid communication with a source of pressurized molten material (not shown) in a well known manner. A nozzle tip 26 is installed at the proximal end 28 of the nozzle housing 22 so that a tip channel 32 formed in nozzle tip 26 is in fluid communication with the melt channel 24 and has at least one outlet aperture 30 in fluid communication with tip channel 32.

In FIG. 1, nozzle tip 26 comprises a tip insert 34 that is retained at the proximal end 28 of nozzle housing 22 by a tip retainer 36 removably affixed to the proximal end 28 of the nozzle housing by threads 38 or their functional equivalent. Tip retainer 36 is preferably configured to receive and retain tip insert 34 when tip retainer 36 is screwed onto proximal end 28 of nozzle housing 22. In this embodiment, the nozzle housing 22 and tip retainer 36 are constructed, arranged and threaded such that the tip retainer 36 installs on external threads on the nozzle housing 22. The tip channel 32 and outlet aperture 30 are in the tip insert 34.

In FIG. 2, nozzle tip 26 comprises a valve gate tip 40 with tip channel 32 and outlet aperture 30 formed therein. Valve gate tip 40 is screwed onto proximal end 28 of nozzle housing 22 and receives a valve stem 42 which has an end 44 that is received in outlet aperture 30 to stop flow of molten material through the outlet aperture 30. Valve stem 42 reciprocates axially to start and stop flow of molten material through outlet aperture 30.

In the embodiments shown, the nozzle housing 22, tip retainer 36 and valve gate tip 40 are substantially cylindrical in cross section with substantially equal outside diameters, so that a substantially cylindrical external heater 46 can be installed over nozzle housing 22 and tip retainer 36 or valve gate tip 40. Heater 46 supplies heat to nozzle housing 22 and tip retainer 36 or valve gate tip 40 to keep the material in melt channel 24 and tip channel 32 molten.

During operation of injection molding nozzle 20, heater 46 directly heats nozzle housing 22 and tip retainer 36 or valve gate tip 40 which transfer heat to the molten material in melt channel 24 and tip channel 32. Tip retainer 36 has a seal ring portion 50, and valve gate tip 40 has a cap portion 52, both of which seat into and seal against a portion of a mold (not shown) to prevent molten material ejected from outlet aperture 30 from leaking past them. It is desirable to minimize heat transfer from the hot tip retainer 36 and valve gate tip 40 to the cold mold through seal ring portion 50 and cap portion 52 respectively. It is also desirable to maximize the heat transfer from heater 46 through tip retainer 36 and valve gate tip 40 to the molten material in tip channel 32. The present invention meets both desires in a thermal gate configuration with a seal ring portion 50 fused to retaining portion 54 of tip retainer 36, and in a valve gate configuration with cap portion 52 fused to tip portion 56 of valve gate tip 40. Seal ring portion 50 and cap portion 52 are preferably made of a material having lower thermal conductivity than retainer portion 54 and tip portion 56 respectively.

Fusing of the two portions is done at junction 58, which preferably is oriented substantially radially. It is important that the inside 60 of junction 58 that is exposed to the injection pressure in the molten material be thoroughly fused so that no molten material is allowed to penetrate into juncture 58. Because of the high injection pressure of the molten material, molten material penetrating into junction 58 can exert enough pressure to break the fused junction 58 between components.

Fusing of components can be done using well-known techniques such as brazing, friction welding and laser welding, however these techniques may detrimentally affect material properties of the fused components. This is particularly true when one of the components is a copper alloy which may begin to anneal at temperatures above 400 degrees Celsius. Brazing temperatures may be too high, and the heat-affected zone for laser and friction welding may be too great to maintain desired material properties in the fused components. Also, the penetration depth for laser welding may not be sufficient for thick parts. For some materials, such as stainless and tool steels, these concerns are minimum and such fusing techniques may be appropriate.

The preferred fusing technique is electron beam welding, especially for more temperature-sensitive materials, such as copper alloys. The penetration depth is much greater than with laser welding, and the heat-affected zone is small compared to other fusing techniques. Since the process is done in a vacuum chamber, the integrity of the weld produced is very good.

Figure 3:
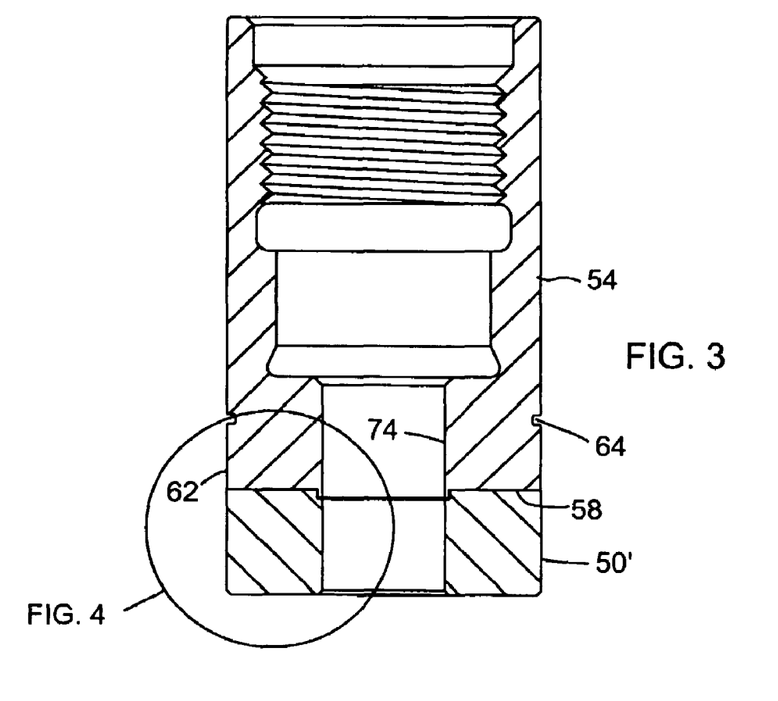
FIG. 3 is a cross section view of a tip retainer of the present invention with two components in position for fusing.
Figure 4:
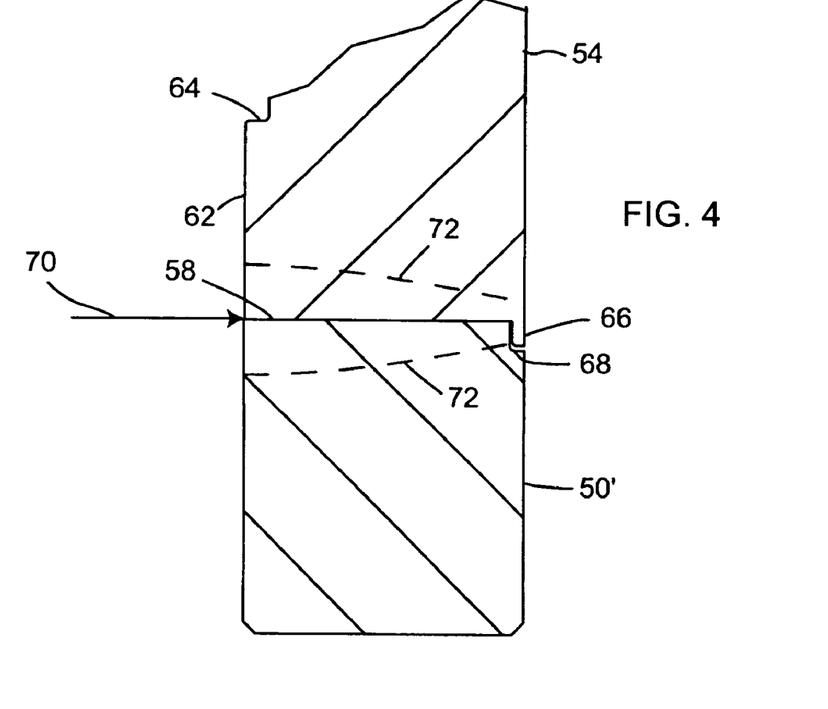
FIG. 4 is a detailed view of a portion of FIG. 3 showing the fusing junction and heat-affected zone.
Figure 5:
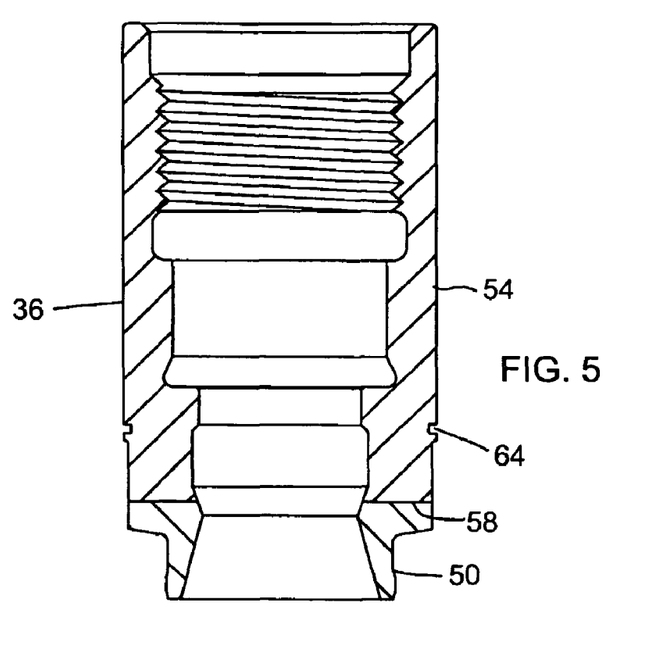
FIG. 5 is a cross sectional view of the tip retainer of FIG. 3 after fusing and final machining.
Figure 6:
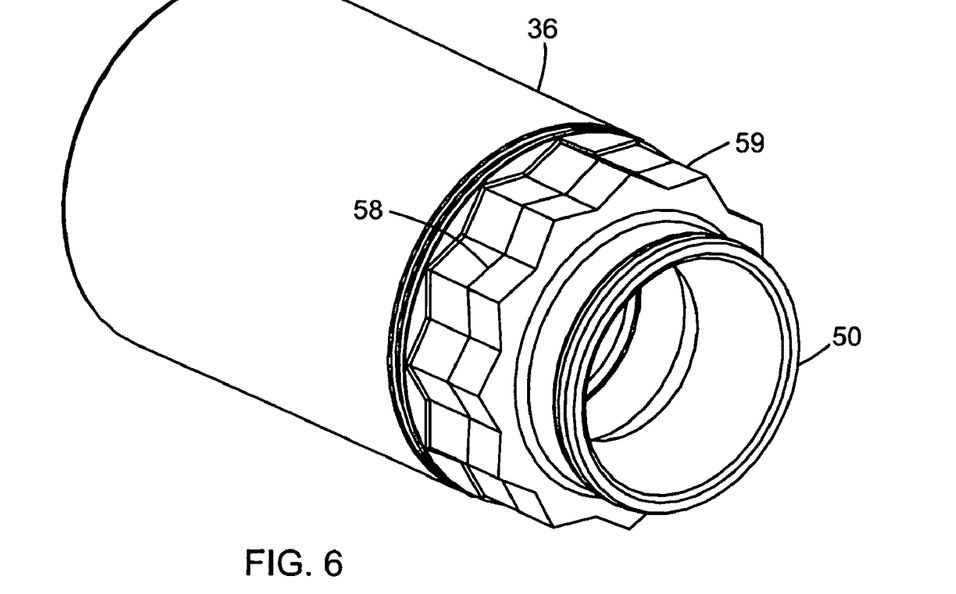
FIG. 6 as an isometric view of the tip retainer of FIG. 5.

Referring to FIGS. 3 and 4, the process for manufacturing tip retainer 36 using the electron beam welding process will now be described. The same process is used to fabricate the valve gate tip 40, which has slightly different geometry. Retainer portion 54 is manufactured leaving a joint end portion 62 with a larger outer diameter and a smaller inner diameter than the final finished diameters. In this embodiment, retainer portion 54 has a circumferential groove 64 which is used to retain heater 46 on nozzle 20. The joint end portion 62 is that portion beyond groove 64. A seal ring blank 50' is manufactured to mate with joint end portion 62. The seal ring blank 50' also has a larger outer diameter and smaller inner diameter than the finished diameters of the seal ring 50. To radially align seal ring blank 50' with joint end portion 62 of retainer portion 54, an alignment feature may optionally be provided between both components, preferably along the inner diameter. In this embodiment, the alignment feature is an axial ridge 66 on joint end portion 62 which is received in a recess 68 in seal ring blank 50'. The alignment features are preferably small enough that they will be machined away during the final machining of tip retainer 36. With seal ring blank 50' properly aligned when butted against joint end portion 62, seal ring blank 50' is preferably clamped against retainer portion 54 in a welding fixture, such as by a bolt extending through the central bore 74 of both components, to keep the abutting surfaces together at junction 58. A gap of up to 0.001 inches between the abutting surfaces is allowable, so the finish on both abutting surfaces only need be fine enough that the interface of the surfaces is within that range. The fixture then rotates the clamped components while the electron beam is directed radially at the junction 58, as indicated by arrow 70, to thoroughly weld sealing ring blank 50' to joint end portion 62. The dashed lines 72 indicate the heat-affected zone adjacent junction 58. The material properties of the parent materials remain substantially unaltered beyond the heat-affected zone. The tip retainer 36 along joint end portion 62 and seal ring 50 is then machined to the final configuration, as illustrated in FIGS. 5 and 6, which removes material adjacent the junction 58, preferably including the alignment feature and any material splayed along the inner and outer edges of junction 58 by the welding process. As shown in FIG. 6, the tool engagement feature 59, in this case a 12-point configuration for a 12-point socket, includes junction 58, so the entire outside surface adjacent the junction is cleaned up during machining of that feature after welding. The result is unitized tip retainer having two portions made of different materials selected for the material properties needed by each portion. In the embodiment described, the desired material properties are thermal conductivity, but the materials for each portion fused can be chosen for any desired material property, such as wear resistance, strength, and resiliency.

Figure 7:
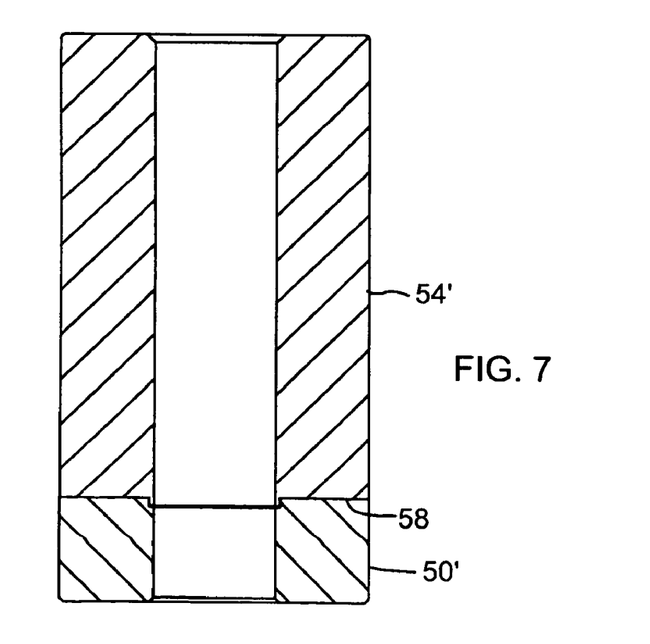
FIG. 7 is a cross section view of to blanks for a tip retainer aligned and ready for fusing.

As illustrated in FIG. 7, the entire retainer portion 54 may be left as a blank 54' before it is fused to the seal ring blank 50', then the entire tip retainer 36 machined to its final configuration as shown in FIG. 5 after fusing. This is the best mode of the invention since it leaves all of the detailed machining until after the fusing where it is all done in one operation. In this embodiment, no alignment feature is provided in the blanks. Sufficient alignment of the two blanks is done in the welding fixture with a bolt through the common bore 74 of the two blanks or by manually aligning the outside surfaces as the two blanks are clamped together. Alternatively, the retainer portion 54 and seal ring 50 could be substantially finished to their final configurations before fusing, with only clean-up of the inner and outer surfaces adjacent the junction 58 needed after fusing.

Figure 8:
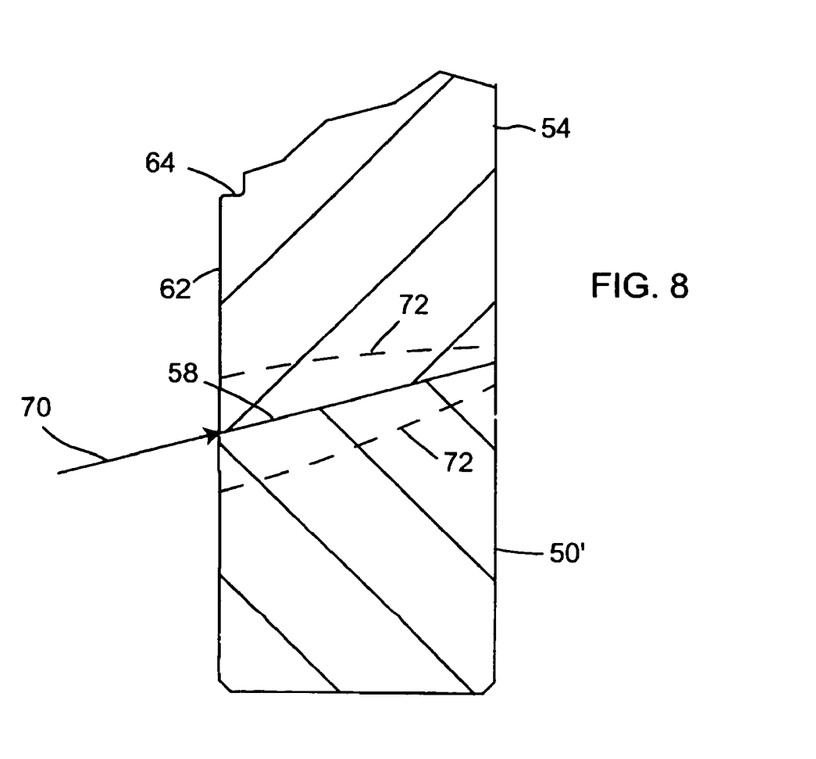
FIG. 8 is the view of FIG. 4 showing an alternative embodiment where the fusing junction is at an angle from radial.

In the embodiment shown, junction 58 is substantially planar and radially oriented. Alternatively, as illustrated in FIG. 8, junction 58 may be oriented at an angle from radial resulting in conical surfaces at junction 58. Such conical surfaces can be self aligning, thereby eliminating the need for the alignment feature on the inner diameter. The welding fixture would be appropriately angled relative to the electron beam to achieve proper welding along junction 58. It will be apparent to one skilled in the art that there are many potential configurations and arrangements for junction 58, including non-linear configurations that fall within the width of the weld, to provide proper alignment of components and allow the electron beam welding process to be properly executed. The invention is not limited to any particular configuration, but encompasses any junction configuration.

Figure 9:
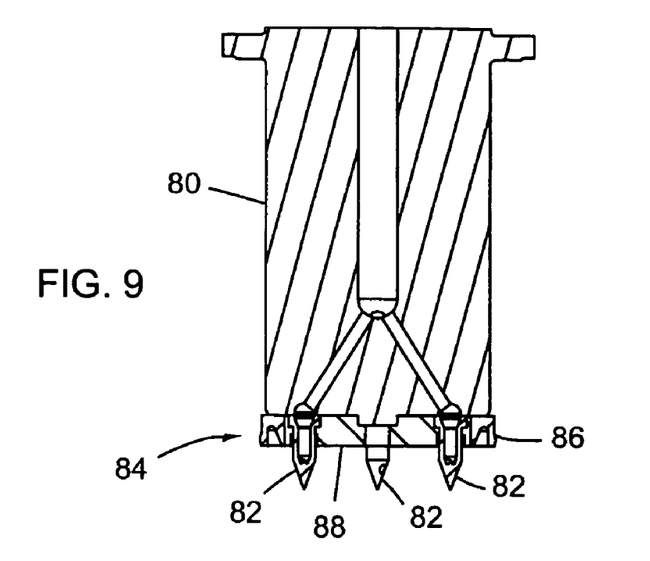
FIG. 9 is a cross sectional view of a multi-probe nozzle assembly having a tip retainer and seal ring of the present invention.
Figure 10:
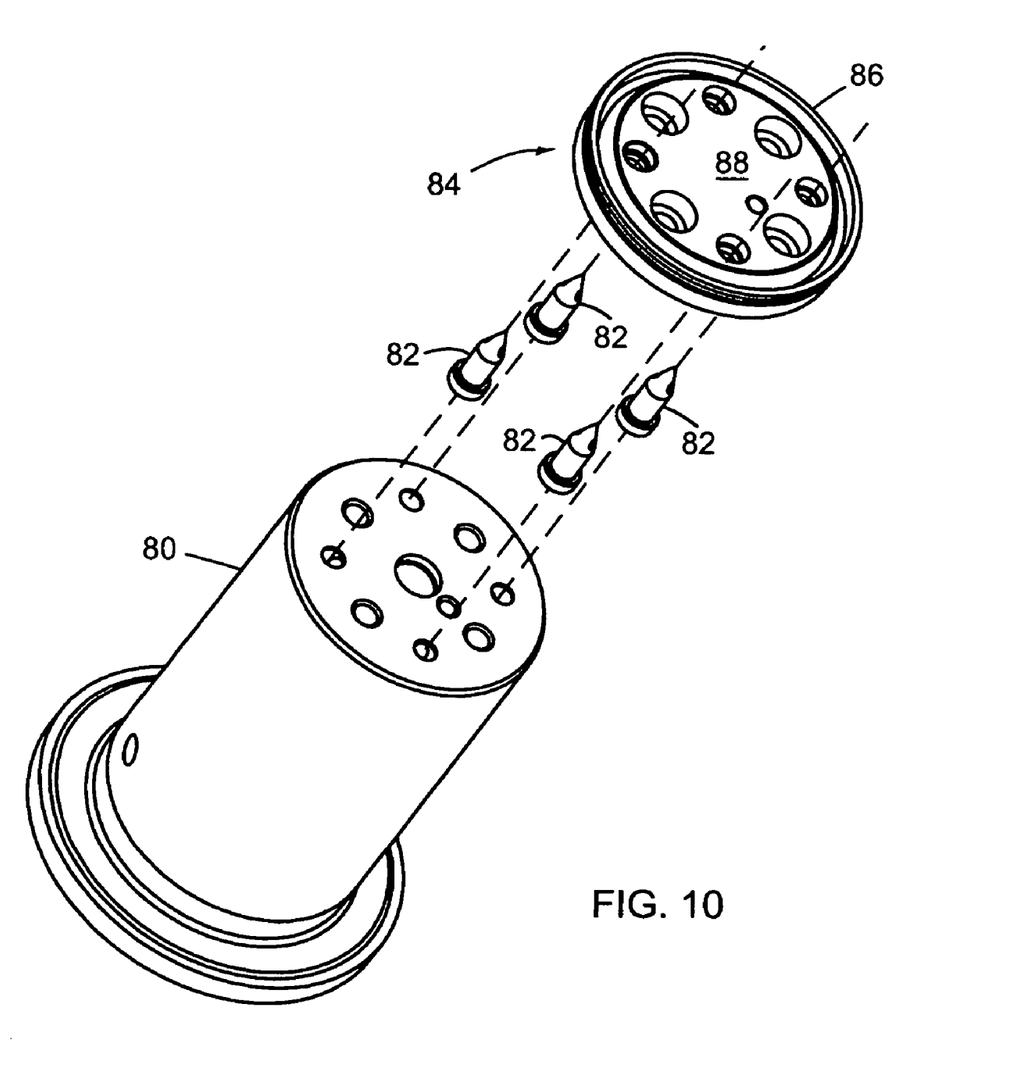
FIG. 10 is then exploded view of the multi-probe nozzle assembly of FIG. 9.

Referring to FIGS. 9 and 10, another nozzle tip configuration to which the present invention can be readily applied is the multi-probe tip. In this configuration, molten material is distributed through a single nozzle body 80 to multiple tips 82. The tips 82 are retained against the nozzle body 80 by a retaining plate 84 that has an outer seal ring 86 which serves the same function as seal ring 50 previously described. Again, there are benefits of making the seal ring 86 from a material having lower thermal conductivity than that of the inner portion 88.

Figure 11:
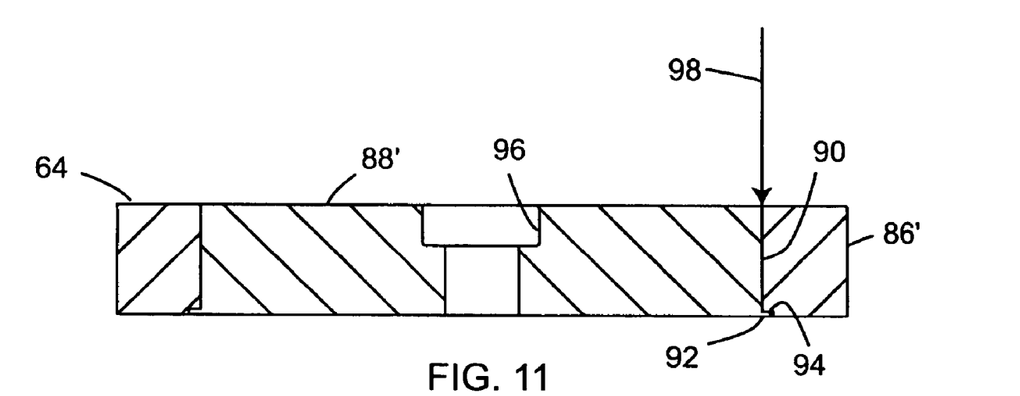
FIG. 11 is a cross sectional view of blanks for the retaining plate with seal ring for the multi-probe nozzle of FIG. 9 aligned for fusing.
Figure 12:
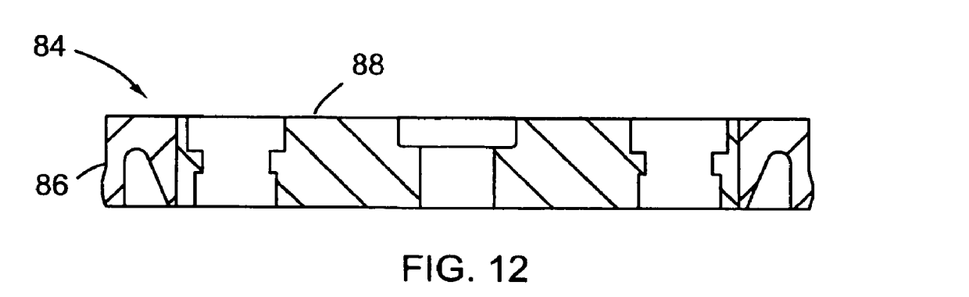
FIG. 12 is the view of FIG. 11 after final machining of the retaining plate.

Referring to FIGS. 11 and 12, to manufacture the retaining plate 84 with two different materials, an inner portion disc 88' and a seal ring blank 86' are formed to have an interface 90 that preferably has a snug fit, but may have up to 0.001 inch clearance. The inner portion disc 88' and seal ring blank 86' are preferably made thicker than final dimensions and an alignment feature is provided in the oversized area to assure the proper axial alignment of the components. In this embodiment, the alignment feature is a circumferential ridge 92 extending out from inner portion disc 88', which is received in recess 94 in seal ring blank 86'. In this embodiment, inner portion disc 88 has a central bore 96 which can be used to attach inner portion disc 88' to a welding fixture and may also be used to align the finished retaining plate 84 with nozzle body 80.

The electron beam is directed axially at interface 90 as illustrated by arrow 98 as the assembled components are rotated to thoroughly weld inner portion disc 88' and seal ring blank 86' at interface 90. The retaining plate 84 is then machined to its final configuration, as illustrated in FIG. 9, which removes material from both faces of retaining, plate 84, including the alignment feature and any material splayed at the ends of interface 90 from the welding process.

The manufacturing process of the present invention can be applied to other injection molding hot runner components, such as manifold bushings, valve stems, nozzle housings and a tip inserts to allow tailoring of the material properties of those components to specific needs of each portion of the component.

Figure 13:
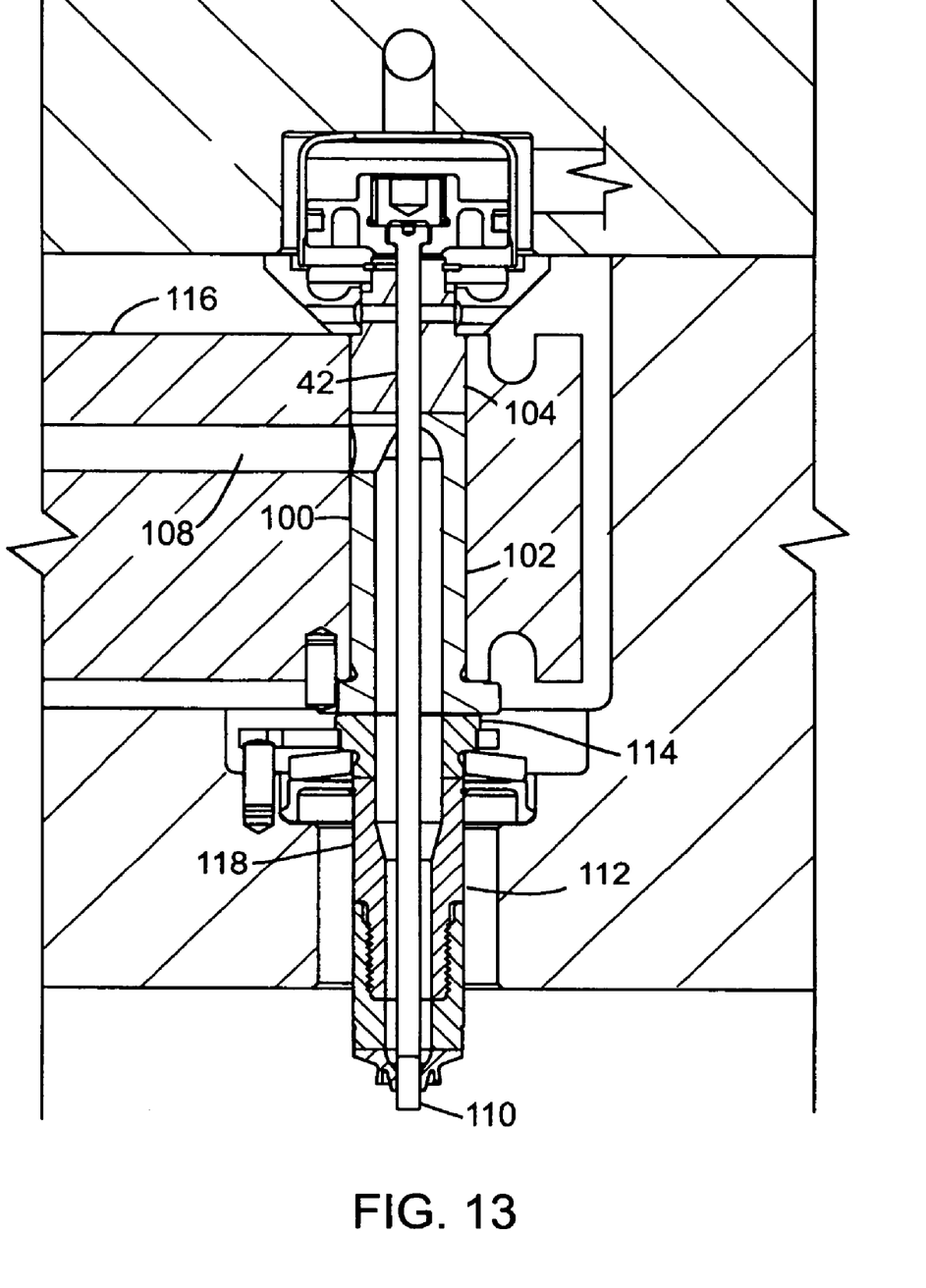
FIG. 13 is a cross sectional view of a portion of a hot runner assembly when illustrating various components that can be manufactured by the method of the present invention.

Referring to FIG. 13, manifold bushing 100 has a lower portion 102 and an upper portion 104 made of different materials The material in the upper portion 104 can be a very hard material, such as tool steel, to properly guide valve stem 42 while lower portion 102 can be made of a material having a high thermal expansion, such a copper alloys, to provide a tight seal in the manifold 116 to prevent leakage from the melt channel 108 at its interface with manifold bushing 100.

Valve stem 42 has tip end 110 that is made from a different material than the remainder of valve stem 42. Tip end can be made from a very wear-resistant material, such as carbide alloys, or the material may be selected for desired thermal conductivity properties.

Nozzle housing 112 may have an flanged portion 114 that is made from a different material than the body portion 118 of nozzle housing 112. The material for flanged portion 114 may be selected for its hardness or low-friction properties at the interface 116 with manifold bushing 110.

Figures 14, 15, 16:
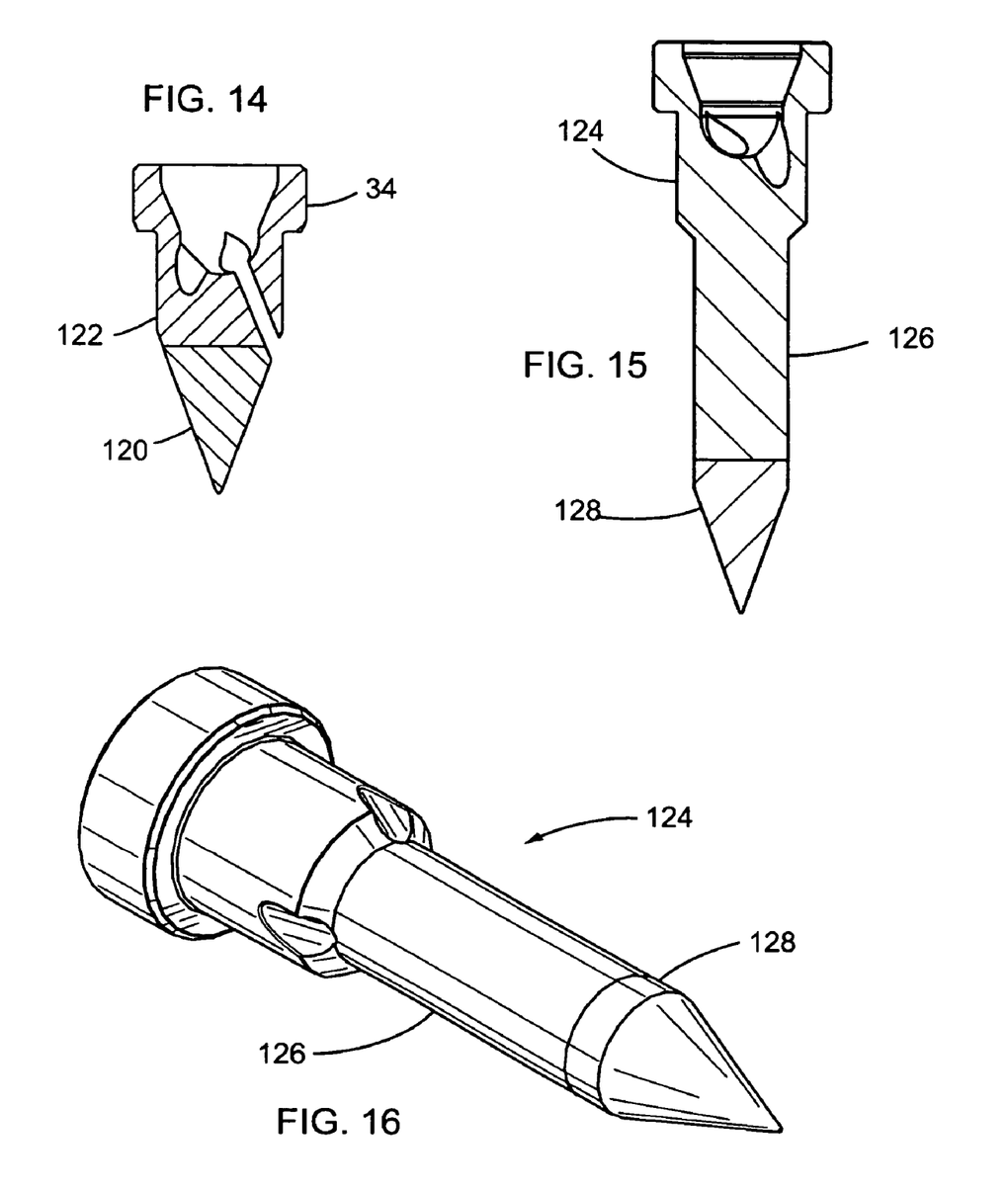
FIG. 14 is a cross sectional view nozzle tip insert of the present invention.
FIG. 15 is a cross sectional view of an extended tip insert of the present invention.
FIG. 16 is an isometric view of the extended tip insert of FIG. 15.

Referring to FIG. 14, tip insert 34 can have an end portion 120 that is made of a different material than shank portion 122. For example, end portion 120 may be made of a carbide alloy that has high wear-resistance and shank portion may be made of a copper alloy that has high thermal conductivity. Likewise, as illustrated in FIGS. 15 and 16, extended tip insert 124 has a shank portion 126 and an end portion 128 that extends from the shank portion 126. The shank portion 126 is preferably formed of material that is significantly more thermally conductive, such as copper alloy, than the material, such as stainless or tool steel, forming the end portion 128. The material for end portion 128 may be selected for its wear resistance as with tip insert 34. The length of end portion 128 is preferably approximately one to two times the diameter of shank portion 126.

It will, of course, be understood that the above description has been given by way of example only and that modifications in detail may be made within the scope of the present invention. For example, while the invention has been described in terms of joining two portions of various injection molding system components, components can have more than two portions joined by the method of the present invention.

The invention claimed is:

1. A method of making a retainer with a retaining portion and a seal ring portion for a hot runner nozzle, comprising the steps of:
    forming a retaining portion from a first material having a thermal conductivity and a passageway for directing molten plastic therethrough;
    forming a seal ring portion from a second material having a thermal conductivity lower than the thermal conductivity of the first material and a passageway for directing molten plastic therethrough;
    aligning the seal ring portion to the retaining portion at a junction such that a surface of the seal ring portions abuts a surface of the retaining portion; and
    fusing the retaining portion and the seal ring portion together at the junction.

2. The method of claim 1, wherein the fusing is done by electron beam welding.

3. The method of claim 1, further comprising the step of machining the fused retaining portion and the seal ring portion to a final configuration which removes material adjacent the junction.

4. The method of claim 1, wherein the aligning is done by an alignment feature formed on the retaining portion and the seal ring portion.

5. The method of claim 4, wherein the alignment feature is a ridge formed in either the retaining portion or the seal ring portion and a recess formed in the other of the retaining portion or the seal ring portion, the recess receiving the ridge to align the retaining portion and the seal ring portion.

6. A method of forming an injection molding nozzle tip retainer, comprising the steps of:
    forming a first blank having a thermal conductivity for a first portion of the nozzle tip retainer;
    forming a second blank having a thermal conductivity lower than that of the thermal conductivity of the first blank for a second portion of the nozzle tip retainer;
    abutting the second blank against the first blank at a junction;
    fusing the first blank and second blank at the junction; and
    machining the fused first and second blanks to a configuration for the first portion and second portion of the nozzle tip retainer.

7. The method of claim 6, wherein the fusing is done by electron beam welding.

8. A method for manufacturing a nozzle tip retaining piece for a hot runner system, the nozzle tip retaining piece having a first portion and a second portion, the method comprising the acts of:
    selecting a first material having a thermal conductivity for the first portion of the nozzle tip retaining piece;
    selecting a second material for the second portion having a thermal conductivity lower than the thermal conductivity for the first portion;
    permanently joining the first portion to the second portion; and
    thereafter, machining at least one of the first or second portions of the nozzle tip retaining piece.

9. The method for manufacturing a nozzle tip retaining piece according to claim 8, wherein the act of permanently attaching is performed by electron beam welding.

10. The method for manufacturing a nozzle tip retaining piece according to claim 9, further comprising the act of providing an internal passageway through the first and second portions for molten plastic to pass therethrough.

11. A method of manufacturing a hot runner nozzle tip retainer, comprising the acts of:
    machining a first blank having a thermal conductivity for a first portion of the nozzle tip retainer, wherein the first portion has an internal bore;
    machining a second blank having a thermal conductivity lower than that of the first blank for a second portion of the nozzle tip retainer, wherein the second blank has an internal bore in fluid communication with the internal bore of the first portion;
    abutting the second blank against the first blank at a junction;
    fusing the first blank and second blank at the junction; and
    thereafter, machining the fused first and second blanks to a configuration for the first portion and second portion of the nozzle tip retainer.

12. The method of claim 11, wherein the fusing is performed by electron beam welding.

* * * * *